(12) United States Patent
Steiner

(10) Patent No.: US 6,367,574 B1
(45) Date of Patent: Apr. 9, 2002

(54) MULTI-FUNCTION CONTROL SYSTEM FOR ARTICULATED VEHICLE

(75) Inventor: Roy I. Steiner, Dalton, OH (US)

(73) Assignee: Venture Products, Inc., Orrville, OH (US)

( * ) Notice: Subject to any disclaimer, the term of this patent is extended or adjusted under 35 U.S.C. 154(b) by 0 days.

(21) Appl. No.: 09/377,945

(22) Filed: Aug. 20, 1999

(51) Int. Cl.$^7$ .............................................. B60K 13/00
(52) U.S. Cl. ........................ 180/333; 180/335; 180/306; 180/307; 180/336; 280/400
(58) Field of Search ................... 180/333, 335, 180/336, 14, 89.1, 306, 307; 280/400

(56) References Cited

U.S. PATENT DOCUMENTS

| | | | |
|---|---|---|---|
| 3,777,837 A | * 12/1973 | Harper | 180/70 |
| 3,783,963 A | * 1/1974 | Erwin | 180/14 X |
| 3,918,527 A | * 11/1975 | Wagner | |
| 4,042,053 A | * 8/1977 | Sieren et al. | 280/400 |
| 4,054,083 A | 10/1977 | Utter | 91/413 |
| 4,055,230 A | * 10/1977 | Kestian et al. | 180/89.1 |
| 4,085,813 A | * 4/1978 | Jourbert | 180/14 |
| 4,256,144 A | * 3/1981 | Barbagli | 180/333 |
| 4,332,177 A | 6/1982 | Andresen | 74/491 |
| 4,389,151 A | 6/1983 | Brown | 414/685 |
| 4,424,878 A | * 1/1984 | Van Der Lely | 180/333 |
| 4,489,805 A | 12/1984 | Okabe | 180/271 |
| 4,553,446 A | 11/1985 | Matsubara | 74/471 R |
| 4,860,465 A | * 8/1989 | Brandt | 180/14 |
| 5,566,778 A | * 10/1996 | Valier et al. | 180/333 X |
| 5,887,669 A | * 3/1999 | Ostler et al. | 180/333 X |

* cited by examiner

Primary Examiner—Lanna Mai
Assistant Examiner—Toan C To
(74) Attorney, Agent, or Firm—Reese Taylor

(57) ABSTRACT

A multi-function control system for use with an articulated vehicle for controlling speed and forward and rear movement of the vehicle through a single control. The system includes an operating lever connected to the vehicle by a double pivot and movable in a first direction to control the forward and reverse movement of the vehicle and in a second direction, normal to the first, to control movement of attachments carried by a hitch attached to the front of the vehicle simultaneously. A second operating lever may be connected to the vehicle by a double pivot and connected to the hydraulic valve for the hitch so that the hitch may be operated independently upon movement of the second lever alone in the second direction. The first and second operating levers are connected for movement together in the first direction.

4 Claims, 2 Drawing Sheets

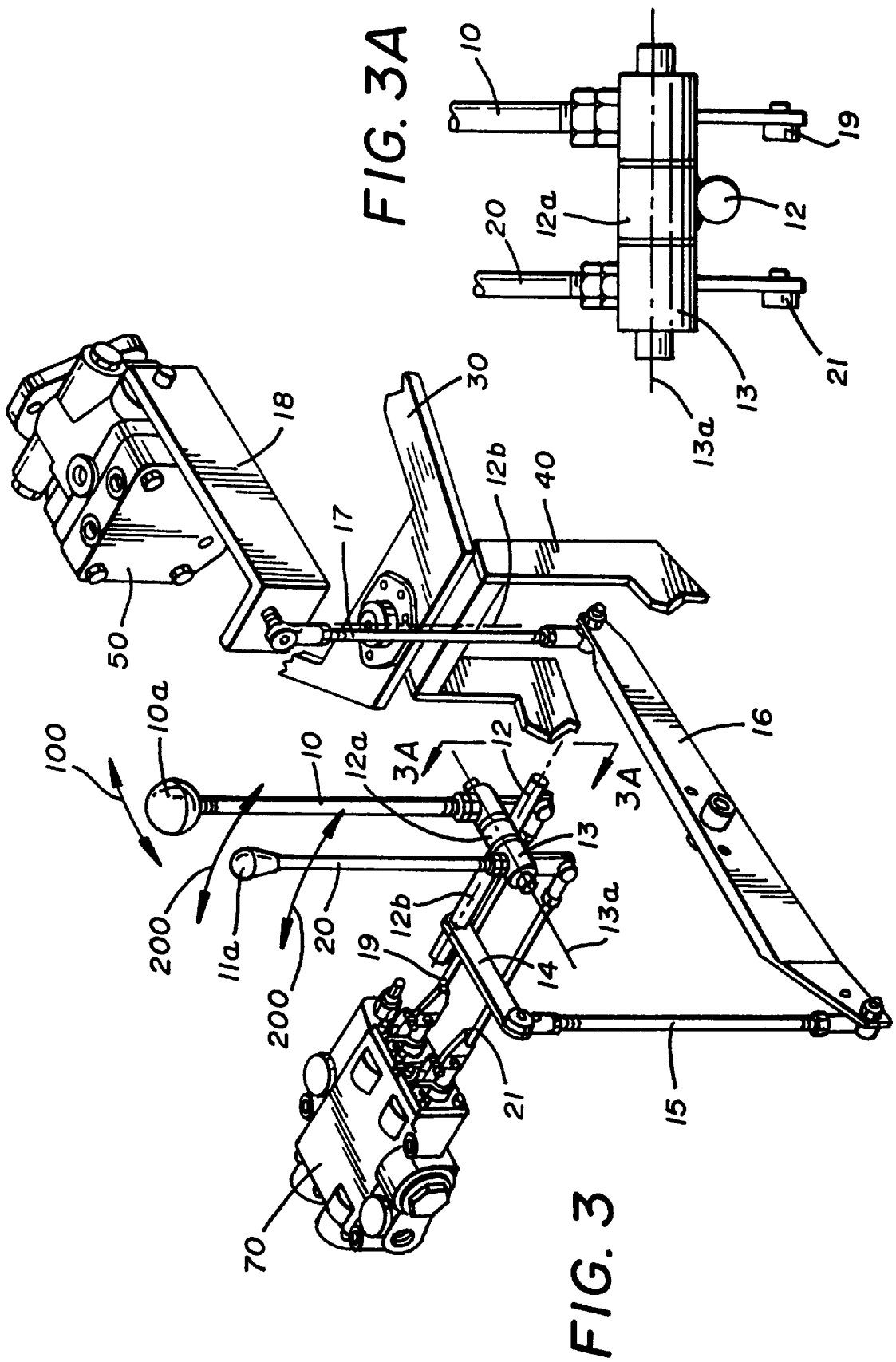

MULTI-FUNCTION CONTROL SYSTEM FOR ARTICULATED VEHICLE

RELATED PATENT APPLICATIONS

None.

FIELD OF THE INVENTION

This invention relates in general to a control system for vehicles and relates in particular to a multi-function control system for controlling full vehicle movement in an articulated vehicle which includes forward and rear components pivotally interconnected and with the forward component carrying a hitch for mounting accessories. The invention relates in particular to a multi-function control system for controlling both the functions of the vehicle itself and the hitch from a central location through a single lever.

BACKGROUND OF THE INVENTION

Articulated vehicles are well known in the prior art with such apparatus including, for example, mowers, bulldozer blades, etc., mounted on a vehicle hitch carried by the forward component with the operator riding on the rear component and controlling the speed and direction of the articulated vehicle and, through secondary controls, operating the attachments to the hitch.

In the prior art, two separate levers are usually utilized with one operating a hydraulic system to control the functions of the attachments carried by the hitch and the other controlling the speed and direction of the vehicle itself. These separate controls are usually mounted on the forward component of the vehicle for access by the operator.

Control of the hitch attachment functions is usually accomplished through a hydraulic system on the hitch, while another hydraulic system is connected to the drive train of the vehicle.

Prior art efforts to accomplish the multiple functions of the vehicle and the hitch efficiently can be seen in Matsubara U.S. Pat. Nos. 4,553,446; Brown 4,389,151; Andresen 4,332,177; and Okabe 4,489,805.

Furthermore, in the prior art, it has been found that it is desirable to enhance the operator's ability and speed to increase the vehicle performance and integrate the control of two different vehicle maneuvering systems, i.e., the hydrostatic forward/reverse of the vehicle and the position and movement of the vehicle hitch and the attachments thereto.

However, it has been found that it is difficult to perform the functions of operating the vehicle and the hitch simultaneously as is often required. If an attempt is made to mechanically connect each of the operating levers so that the vehicle and the attachments can be operated simultaneously, movement of one lever disadvantageously moves the other. It has also been found that it is not always easy to relate the required hand movement with the desired implement or attachment movement.

It is, therefore, believed desirable to provide a multi-function control which facilitates maneuvering both the vehicle and the attachments with ease simultaneously or, if desired, separately.

SUMMARY OF THE INVENTION

It has been found that the above-identified advantages can be obtained by providing a multi-function control system for use with a vehicle having a forward component with a hitch component which is pivotally attached to a rear component carrying the operator and the control is for both the vehicle and the hitch.

It has been found that operation of both components can be facilitated by providing a control system mounted on the rear component with an operating lever assembly being movable in a first direction to control the movement of the vehicle in a forward and reverse direction and in a second direction normal to the first direction to control the functions of the hitch and, thus, the attachments thereto.

It has been found that the objects of the invention can further be achieved by providing that the control system can include two operating levers, with these levers moving together in the first direction for the forward and reverse movement of the vehicle, but with one also being independently movable in the second direction to control the movement of the attachments to the hitch.

It has been found that this can be achieved by providing a double pivot connection so that the first operating lever is pivotable in a first and second direction and the second operating lever is also pivotable in a first and second direction with the second operating lever controlling and being linked to the spool valve which controls the functions of the attachment to the hitch.

It has been found that the above objects can be achieved by providing a mechanical linkage between the control system and the power sources for the vehicle and the hitch to avoid the problems encountered with a chain or cable linkage and by mounting the principal vertical pivot point of the operating lever system closely adjacent to and parallel to the axis running through the pivotal attachment between the forward and rear components of the vehicle and along the longitudinal centerline of the rear component.

Accordingly, production of an improved multi-function control system of the character above described becomes the principal object of this invention with other objects thereof becoming more apparent upon a reading of the following brief specification considered and interpreted in view of the accompanying drawings.

BRIEF DESCRIPTION OF THE DRAWINGS

FIG. 3 is a perspective schematic view showing the multi-function control system and its attachment to the pump control of the hitch attachments and the drive train of the vehicle.

BRIEF DESCRIPTION OF THE PREFERRED EMBODIMENTS

Figure 1:
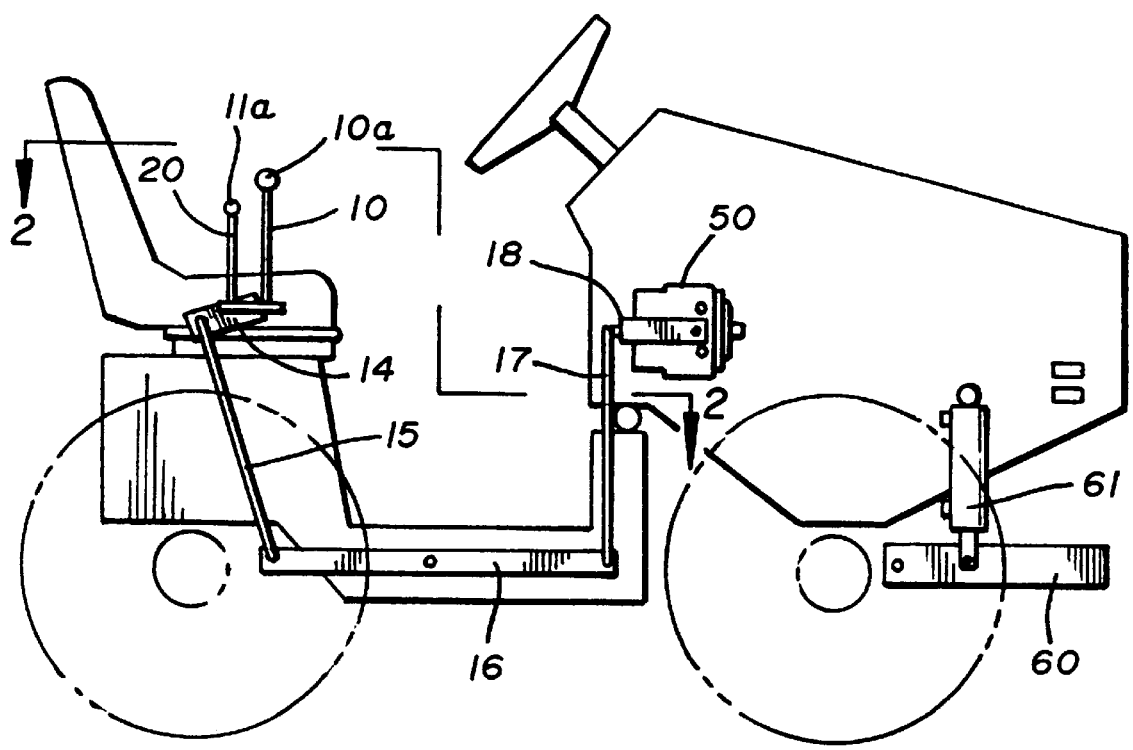
FIG. 1 is an elevational schematic view of a vehicle of the type described, together with the control system.

From FIG. 1 of the drawings, it will be seen that an articulated vehicle is illustrated as having forward and rear components pivotally interconnected to each other and supported by the usual wheels and axles. The motor and steering wheel are carried by the forward component along with the hitch 60 which the operator rides on the rear component which also carries the control system which is readily accessible to him or her.

Figure 2:
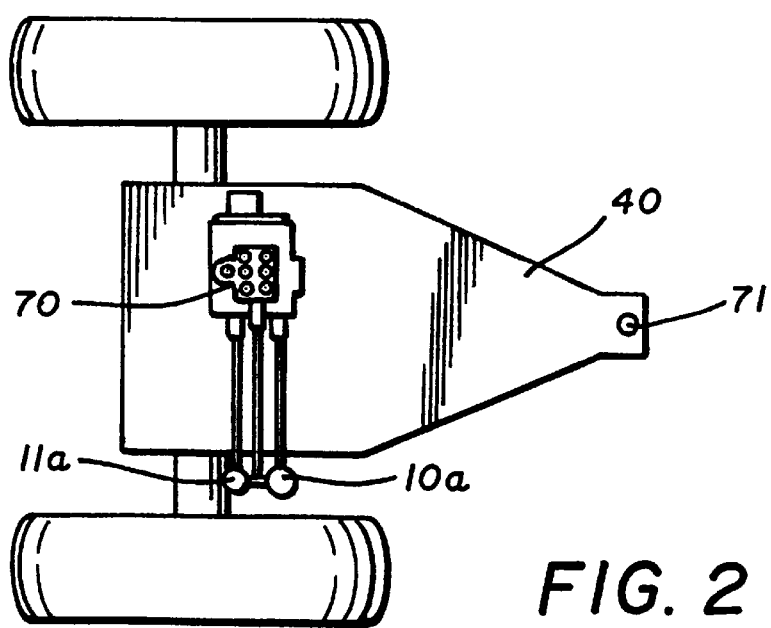
FIG. 2 is a top plan schematic view of the rear component of the vehicle showing a portion of the control system.

It will be seen, particularly from FIG. 3 of the drawings, that the improved multi-function control system is associated with the front and rear frames 30 and 40 of the vehicle components and includes a first operating lever 10 and a second operating lever 20. These operating levers take the form of elongate shafts with the usual operating or gripping knobs 10a, 11a disposed on their upwardly-projecting ends. It will be readily seen from FIGS. 1 through 3 that these levers are mounted on the rear frame 40 of the vehicle, adjacent the operator in known fashion.

The operating levers 10 and 20 are pivotally attached by means of a double pivot to the rear frame 40 of the vehicle. In that regard, lever 10 is mounted for pivotal movement relative to shaft 12 through connector 12a which is welded or otherwise secured to shaft 12. Similarly, operating lever 20 is secured by rod 13 to the connector 12a.

In this fashion, it will be seen that the operating lever 10 is movable in a forward and reverse direction, generally indicated by the numeral 100, pivoting about the axis 12b of shaft 12. This movement in the direction of the arrow 100 will cause the vehicle to selectively move in a forward or reverse direction and, responsive to the degree of movement, will increase or decrease the speed of the vehicle as will be described below.

This control is achieved through link arm 14 attached to shaft 12, rod 15 attached to link arm 14, rocker arm 16 attached to rod 15, rod 17 attached to rocker arm 16 which is pivotally mounted on rear frame 40, and pump control lever 18 which interconnects pump control lever 18 to hydrostatic pump 50. Inasmuch as hydrostatic pump 50 controls speed and forward/reverse movement of the vehicle in known fashion, it will be seen that movement of operating lever 10 in the direction of arrow 100 will control the operation of the vehicle per se.

The second operating lever 20 is also connected with a double pivot and is movable in the direction of the arrow 200 about axis 13a of shaft 13. It is also movable in the direction of the arrow 100 so that when the operating lever 10 is moved forward to increase or decrease speed or change vehicle direction, the second operating lever 20 also follows in that direction without any effect on its principal function which is to operate the attachments to the front frame 30. However, if operating lever 10 is moved both in the direction of arrows 100 and 200 simultaneously, both vehicle and hitch functions can be controlled simultaneously because both levers 10 and 20 are linked to hydraulic valve spool 70 by links 19 and 21, respectively.

However, when it is desired to control the attachments to the hitch 60 mounted on front frame 30 independently, the second operating lever 20 can be moved in the direction of the arrow 200 alone. This does not interfere at all with the function of the first operating lever 10.

It will be noted that the second operating lever 20 is optional. As just explained, the simultaneous multi-function control is possible through lever 10 alone. However, operating lever 20, if employed, provides the added capability just described.

Of primary importance to the functioning of the multi-function control system of the invention is the location of the shaft 17 which will be noted as being vertically disposed between rocker arm 16 and pump control lever 18. It will also be noted that the first operating lever 10 is located in a vertical condition parallel to shaft 17, their longitudinal axes being parallel to the longitudinal axis 12b of the pivotal connection between front frame 30 and rear frame 40. In this fashion, the control movement takes place directly on or very near the centerline of the vehicle. This avoids any variation in control performance inasmuch as it is often the case that the front frame and rear frames 30 and 40 will be tilted relatively to each other. However, disposing the transfer of the forward/reverse control linkage through the center pivot point minimizes and almost eliminates variations in the precision of the control should such oscillation occur.

While a full and complete description of the invention has been set forth in accordance with the dictates of the patent statutes, it should be understood that modifications can be resorted to without departing from the spirit hereof or the scope of the appended claims.

What is claimed is:

1. A multi-function control system for use with a vehicle having a drive train and having forward and rear components pivotally interconnected to each other and having a hitch movably attached to the forward component and a hydrostatic pump connected to the drive train of the vehicle and a hydraulic spool valve operatively connected to the hitch, comprising:
    a) an operating lever mounted on the rear component;
    b) said operating lever carried by the rear component and
        1) controlling the forward and reverse movement of the vehicle upon movement in a first direction, and
        2) controlling movement of the hitch upon movement in a second direction;
    c) said operating lever is operatively connected to said hydrostatic pump;
    d) said operating lever is operatively connected to said spool valve; and
    e) a second operating lever carried by the rear component and movable in a first direction with said first operating lever and in a second direction to control movement of the hitch when moved in said second direction normal to said first direction independently of said first lever.

2. The multi-function control system of claim 1 wherein said second operating lever is operatively connected to said spool valve.

3. The multi-function control system of claim 1 wherein said second control lever is movable in said first direction together with said first control lever.

4. The multi-function control system of claim 1 wherein said first control lever is connected to said hydrostatic pump by means of a linkage which includes an elongate shaft carried by the rear component and disposed adjacent the axis of pivotal attachment between the forward and rear components of the vehicle.

* * * * *